(12) United States Patent
Gammel et al.

(10) Patent No.: US 8,520,839 B2
(45) Date of Patent: Aug. 27, 2013

(54) DATA TRANSMITTER WITH A SECURE AND EFFICIENT SIGNATURE

(75) Inventors: Berndt Gammel, Markt Schwaben (DE); Laurent Beaurenaut, Neubiberg (DE); Michael Brauer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/273,295

(22) Filed: Oct. 14, 2011

(65) Prior Publication Data

US 2012/0093312 A1    Apr. 19, 2012

(30) Foreign Application Priority Data

Oct. 15, 2010  (DE) .......................... 10 2010 042 539

(51) Int. Cl.
*H04L 9/06* (2006.01)
(52) U.S. Cl.
USPC ............... 380/28; 380/37; 380/255; 713/180; 713/181
(58) Field of Classification Search
None
See application file for complete search history.

(56) References Cited

U.S. PATENT DOCUMENTS

| 7,263,186 B2 * | 8/2007 | Chang et al. | 380/37 |
| 8,102,999 B2 * | 1/2012 | Corndorf | 380/37 |
| 8,204,216 B2 * | 6/2012 | Patel | 380/28 |
| 2007/0245147 A1 | 10/2007 | Okeya | |
| 2008/0104397 A1 * | 5/2008 | Paddon et al. | 713/168 |

FOREIGN PATENT DOCUMENTS

| EP | 1387542 A2 | 2/2004 |
| WO | 2008052137 A2 | 5/2008 |

OTHER PUBLICATIONS

Samiah et al., An Efficient Software Implementation of AES-CCM for IEEE 802.11iWireless Standard, IEEE, 2007.*
Menezes et al., Handbook of Applied Cryptography, CRC Press, 1997, pp. 338-359.*

* cited by examiner

*Primary Examiner* — Minh Dinh
(74) *Attorney, Agent, or Firm* — Murphy, Bilak & Homiller, PLLC

(57) ABSTRACT

An encryption device encrypts a first block of user data to obtain a first encryption result and encrypts a second block of user data, which follows the first block of user data, to obtain a second encryption result. The encryption device uses the first encryption result for encrypting the second block of user data. An extractor extracts a first portion of the first encryption result, the first portion being smaller than the first encryption result, and a second portion of the second encryption result, the second portion being smaller than the second encryption result. A message formatter combines the first block of user data and the first portion as a signature for the first block to produce a first transmission packet, and combines the second block of user data and the second portion as a signature for the second block to produce a second transmission packet.

23 Claims, 9 Drawing Sheets

DATA TRANSMITTER WITH A SECURE AND EFFICIENT SIGNATURE

PRIORITY CLAIM

This application claims priority to German Patent Application No. 10 2010 042 539.7 filed on 15 Oct. 2010, the content of said application incorporated herein by reference in its entirety.

TECHNICAL FIELD

Exemplary embodiments of the present invention relate to a data transmitter, particularly a data transmitter which transmits successive blocks of user data with a secure but efficient signature.

BACKGROUND

The communication protocols used in the automotive industry for the communication between sensors and controllers contain no precautions against the manipulation of the transmitted data by hackers. These attacks include tuning engines and breaking engine immobilizers, for example. Engine tuning can result in significant financial damage on the part of the automotive manufacturer, for example. In addition, for electric road vehicles (E-car) and the networking thereof, the authentication of the communication partners, e.g. the authentication between sensors and controllers, and the protection of the integrity of the transmitted data may assume a high level of significance in the future.

In the automotive industry, both unidirectional and bidirectional protocols are used for networking sensors and controllers, for example. Known protocols in the automotive industry are the SENT protocol (SENT=single edge nibble transmission) and the PSI5 protocol (PSI5=peripheral sensor interface 5, a digital interface for sensors), for example. The SENT protocol is a unidirectional protocol which is standardized in the SAE J2716 standard and can be used as a digital sensor interface, e.g. for connecting engine pressure sensors or Hall sensors, which detect valves or pedal positions, for example, to the ECU (ECU=engine control unit, engine controller). The PSI5 protocol is a bidirectional protocol which can be used for connecting airbag sensors, for example.

Usually, the known protocols used in the automotive industry have CRC protection (CRC=cyclic redundancy check) in order to detect transmission errors which may arise particularly in the engine surroundings, which have a high level of electromagnetic noise. However, the known protocols used in the automotive industry have no protection for the transmitted data against malicious attacks, e.g. by hackers. By way of example, a hacker could manipulate the transmitted data for a pressure sensor in order to use manipulated or corrupted data at the input of the engine controller to manipulate the data at the output of the engine controller, which can achieve a power increase for the engine (tuning the engine), for example. However, as already mentioned, the CRC protection of the known protocols used in the automotive industry does not protect the transmitted data against the manipulation, since the correct CRC bits can easily be calculated for the corrupted data.

The standardized protocols in the automotive sector, which, in addition to the SENT and PSI5 protocols, also include the protocols SEC, CAN (CAN=controller area network, an ISO standard protocol for automotive applications) and FlexRay (a serial, deterministic and error-tolerant field bus system for use in automobiles), cannot be extended by the known measures for protecting integrity. By way of example, appending an MAC (MAC=message authentication code) to the data in a transmitted protocol frame or else transmitting an entire MAC in a suitable frame subsequent to the data is not possible, firstly because the protocol frames can no longer be extended—for reasons of compatibility—to the extent required by the known measures for protecting integrity, and secondly because the realtime capability means that it is not possible to transmit or insert any additional frames to this required extent.

SUMMARY

Embodiments described herein provide secure but efficient communication between a data transmitter and a data receiver.

In one embodiment, a data transmitter is provided for transmitting successive blocks of user data which is operable to encrypt a first block of user data in order to obtain a first encryption result and to encrypt a second block of user data using a portion of the first encryption result in order to obtain a second encryption result. The data transmitter is operable to use a portion of the first encryption result, which portion is smaller than the first encryption result, as a signature for the first block of user data and to use a portion of the second encryption result, which portion is smaller than the second encryption result, as a signature for the second block of user data and to produce a first transmission packet which has the first block of user data and the first signature and to produce a second transmission packet which has the second block of user data and the second signature.

In another embodiment, a data receiver is provided for receiving the first transmission packet and the second transmission packet. The first and second received transmission packets each have a received block of user data and a received signature. The data receiver is operable to encrypt the first received block of user data in order to obtain a first encryption result and to encrypt the second received block of user data using the first encryption result in order to obtain a second encryption result. The data receiver is operable to use a portion of the first encryption result, which portion is smaller than the first encryption result, as a reference signature for the first received block of user data and to use a portion of the second encryption result, which portion is smaller than the second encryption result, as a reference signature for the second block of user data. The data receiver is operable such that for a valid first received transmission packet the first reference signature is the same as the received signature from the first received block of user data, and that for a valid second received transmission packet the second reference signature is the same as the received signature from the second received block of user data.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

In the description of the exemplary embodiments which follows, elements which are the same or which have the same effect are provided with the same reference symbols in the figures.

Figure 1:
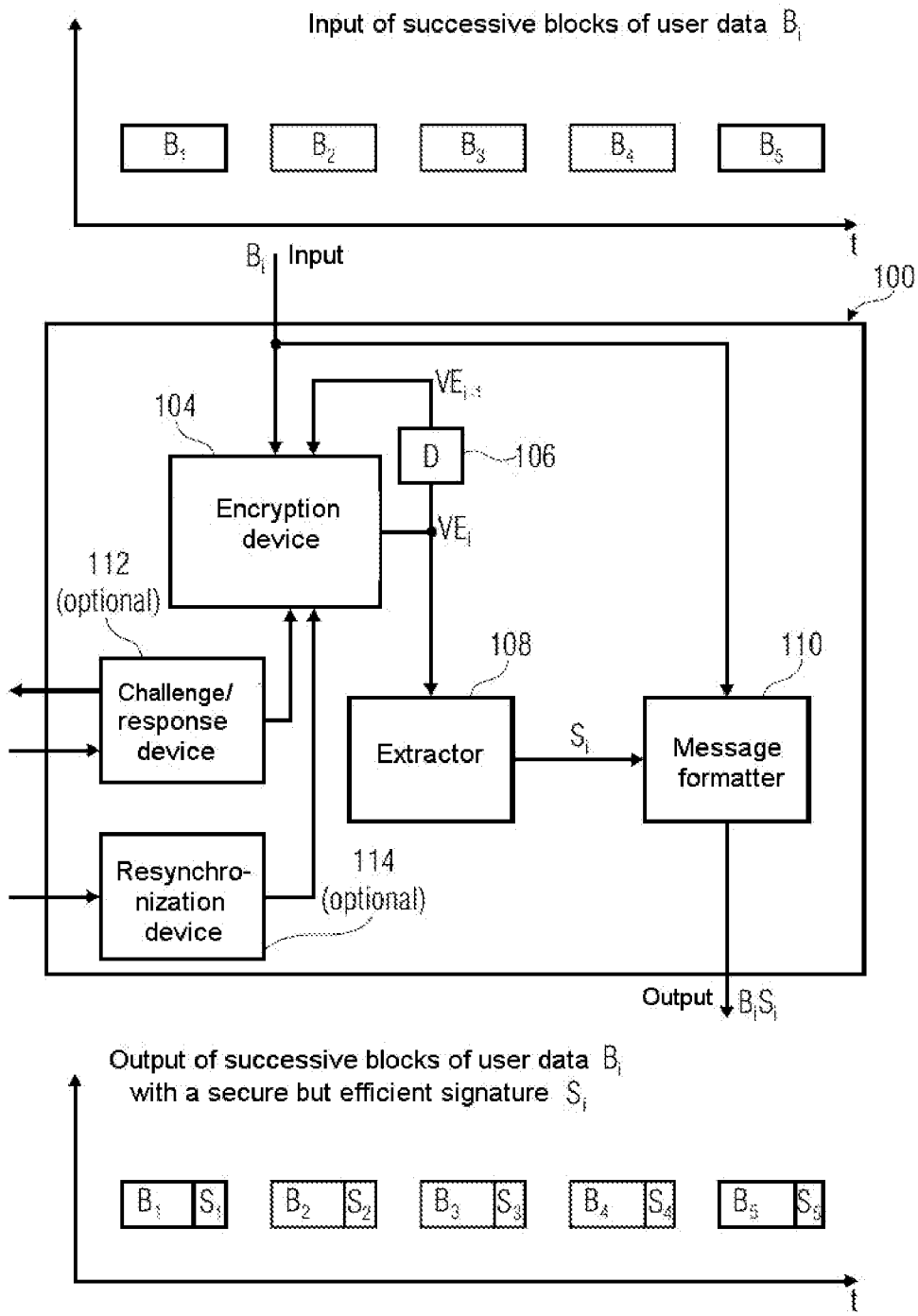
FIG. 1 shows an aspect of a data transmitter for transmitting successive blocks of user data.

FIG. 1 shows an embodiment of a data transmitter 100 for transmitting successive blocks of user data $B_i$. An encryption device 104 is operable to encrypt a first block of user data $B_1$ in order to obtain a first encryption result $VE_1$ and to encrypt a second block of user data $B_2$, which follows the first block of user data $B_1$, in order to obtain a second encryption result $VE_2$. The encryption device 104 is also operable to use the first encryption result $VE_1$ for encrypting the second block of user data $B_2$. To this end, the data transmitter 100 may have a delay device 106, for example, which is operable to store the prior encryption result $VE_{i-1}$ from the prior block of user data $B_{i-1}$ and to output it after a delay in order to provide the stored prior encryption result $VE_{i-1}$ to the encryption device 104 for encrypting the subsequent block of user data $B_i$ in order to obtain the encryption result $Vi_e$. Thus, by way of example, the third encryption result $VE_3$ from the third block of user data $B_3$ can be stored by the delay device 106 and output after a delay, so that the encryption device 104 can use the third encryption result $VE_3$ for encrypting the fourth block of user data $B_4$ in order to obtain the fourth encryption result $VE_4$.

The data transmitter 100 also has an extractor 108 which is operable to extract a portion of the encryption result $VE_i$, herein the extracted portion of the encryption result $VE_i$ is smaller than the encryption result $VE_i$. The extractor 108 may also be operable to output the extracted portion of the encryption result $VE_i$ as a signature $S_i$ for the block of user data $B_i$. Thus, the extractor 108 is able, for example, to extract a portion of the first encryption result $VE_1$, which portion is smaller than the first encryption result $VE_1$, and to output this portion as a signature $S_1$ for the first block of user data $B_1$, and to extract a portion of the second encryption result $VE_2$, which portion is smaller than the second encryption result $VE_2$, and to output this portion as a signature $S_2$ for the second block of user data $B_2$.

Furthermore, the data transmitter 100 has a message formatter 110 for combining the block of user data $B_i$ and the signature $S_i$ in order to produce a transmission packet $B_iS_i$. Hence, the message formatter 100 is able, by way of example, to combine the first block of user data $B_1$ with the extracted portion of the first encryption result $VE_1$ as a signature $S_1$ in order to produce a first transmission packet $B_1S_1$ and to combine the second block of user data $B_2$ with the extracted portion of the second encryption result $VE_2$ as a signature $S_2$ in order to produce a second transmission packet $B_2S_2$.

The data transmitter 100 therefore produces a secure but efficient signature $S_i$ for each block of user data $B_i$, wherein each block of user data $B_i$ is transmitted with the relevant signature $S_i$ as a transmission packet $B_iS_i$. The signature $S_i$ is firstly efficient, since only a portion of the respective encryption result $VE_i$ is used as a signature $S_i$, and secondly secure, since the block of user data $B_i$ is encrypted using the prior encryption result $VE_{i-1}$ from the prior block of user data $B_{i-1}$. If the extracted portion of the encryption result $VE_i$ comprises one bit, for example, and the signature therefore has only this one bit, the probability P of manipulation of the block of user data $B_i$ remaining unnoticed would be $P=2^{-N}$, where N is the number of transmitted blocks of user data $B_i$.

After twelve transmitted blocks of user data $B_i$, for example, only one attack from 4,096 attacks would remain unnoticed. The probability of recognizing manipulation of the blocks of user data $B_i$ increases with the number N of transmitted transmission packets $B_iS_i$. For this reason, it is possible to encrypt ten or more blocks of user data $B_i$ which follow the second block of user data $B_2$ in order to obtain further encryption results, wherein each further block of user data $B_i$ is encrypted on the basis of a prior encryption result $VE_i$. Furthermore, the extracted portion of the encryption result $VE_i$, which portion is used as a signature $S_i$, may be naturally longer than 1 bit, wherein for an efficient signature $S_i$ the number N of extracted bits needs to be chosen such that the extracted portion of the encryption result $VE_i$ is less than ⅛ of the bits of the encryption result $VE_i$.

Furthermore, the data transmitter 100 may have an optional challenge/response device 112, e.g. for performing a challenge/response check, and/or an optional resynchronization device 114, e.g. for resetting the encryption device. The precise description of the challenge/response device 112 and of the resynchronization device 114 is given in the description of FIGS. 5 and 6, for which reason a detailed description is dispensed with at this junction.

Figure 2:
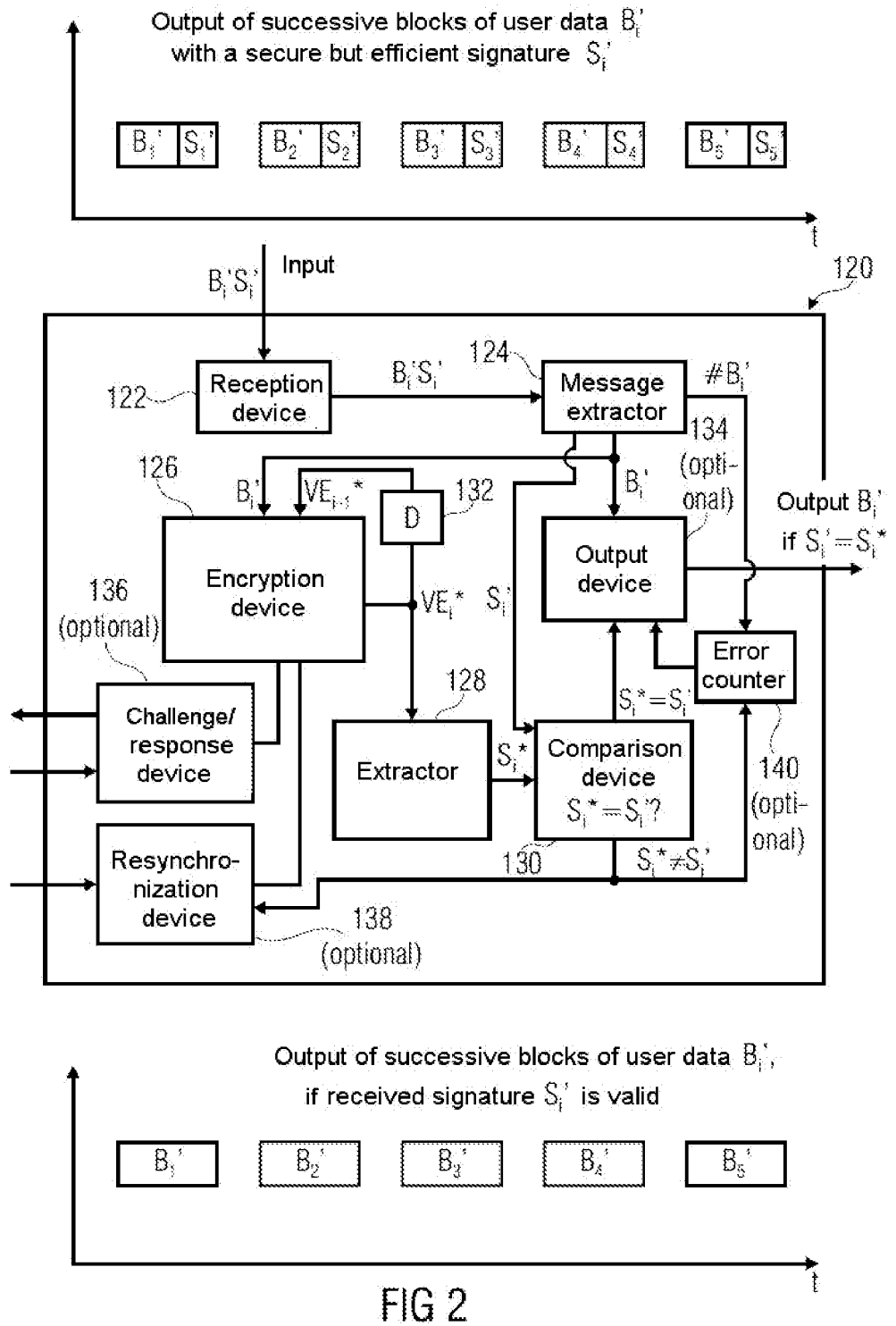
FIG. 2 shows an aspect of a data receiver for receiving successive transmission packets.

FIG. 2 shows an embodiment of a data receiver 120 for receiving successive transmission packets $B_i'S_i'$. The data receiver 120 has a reception device 122 for receiving transmission packets $B_i'S_i'$, e.g. for receiving a first transmission packet $B_1'$ and a second transmission packet $B_2'$. Each transmission packet $B_i'S_i'$ has a received block of user data $B_i'$ and a received signature $S_i'$ for the received block of user data $B_i'$. Furthermore, the data receiver 120 has a message extractor 124 for extracting the received transmission packet $B_i'S_i'$ in order to obtain the received block of user data $B_i'$ and the received signature $S_i'$ for the received block of user data $B_i'$. Hence, by way of example, the first received block of user data $B_1'$ and the first received signature $S_1'$ and also the second received block of user data $B_2'$ and the second received signature $S_2'$ can be obtained.

In order to check the received signature $S_i$, the data receiver 120 has an encryption device 126, an extractor 128 and a comparison device 130. The encryption device 126 is operable to encrypt a first received block of user data $B_1'$ in order to obtain a first encryption result $VE_1^*$ and to encrypt a second received block of user data $B_2'$ in order to obtain a second encryption result $VE_2^*$. The encryption device 126 is also operable to use the first encryption result $VE_1^*$ for encrypting the second received block of user data $B_2$. To this end, the data receiver 120 may have a delay device 132, for example, which is operable, for example, to store a prior encryption result $VE_{i-1}*$ for the prior block of user data $B_{i-1}'$ and to output it after a delay in order to provide the stored prior encryption result $VE_{i-1}*$ from the encryption device 126 for encrypting the subsequent block of user data $B_i$ in order to obtain the subsequent encryption result $VE_i*$. Thus, for example, the fourth encryption result $VE_4*$ from the fourth received block of user data $B_4'$ can be stored by the delay device 132 and output after a delay, so that the encryption device 126 can use the fourth encryption result $VE_4*$ for encrypting the fifth received block of user data $B_5'$ in order to obtain the fifth encryption result $VE_5*$.

The extractor 128 is operable to extract a portion of the encryption result $VE_i*$ in order to obtain a reference signature $S_i*$. The encryption device 126 and the extractor 128 are operable so that for a valid transmission packet $B_i'S_i'$ the reference signature $S_i*$ is the same as the received signature $S_i'$ from the received block of user data $B_i$.

The data receiver 120 may also have an optional output device 134 which is operable to output the received block of user data $B_i'$ if the received signature $S_i'$ from the received block of user data $B_i'$ is the same as the reference signature $S_i*$ and to reject the received block of user data $B_i'$ and trigger a resynchronization event if the received signature $S_i'$ from the received block of user data $B_i'$ is not the same as the reference signature $S_i*$. To this end, the data transmitter 120 may have a resynchronization device 138, for example. The mode of operation of the resynchronization with a data transmitter 100 is described more precisely in the description for FIG. 6, as a result of which a detailed description of which is dispensed with at this juncture. Furthermore, the data receiver 120 may have an optional challenge/response device 136, e.g. for performing a challenge/response check. The precise description of the challenge/response device 136 is likewise given in the description for FIG. 6, for which reason a detailed description is dispensed with at this juncture.

The data transmitter 100 and the data receiver 120 can be used for setting up bidirectional protocol, for example. The mode of operation of the data transmitter 100 and of the data receiver 120 will therefore be described by way of example below using an extension of the known SENT protocol. For alternative embodiments, the data transmitter 100 and the data receiver 120 are operable to operate using a bidirectional protocol, such as the PSI5 protocol.

Figure 3:
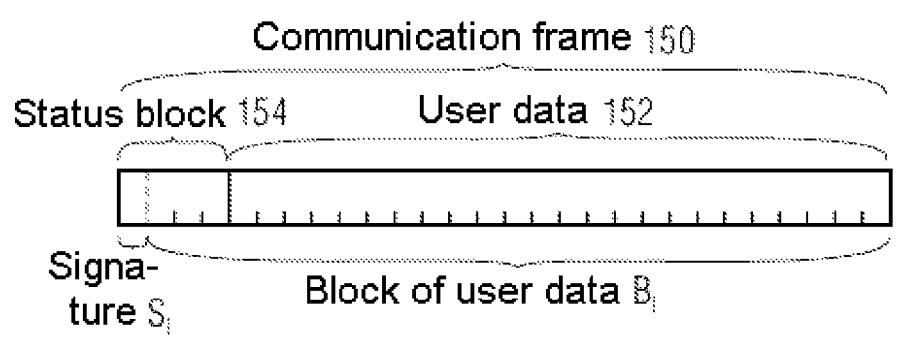
FIG. 3 shows a communication frame from a relatively high protocol layer of the SENT protocol.

FIG. 3 shows a communication frame 150 from a relatively high protocol layer of the SENT protocol. From the point of view of the application layer, the communication frame 150 of the SENT protocol has 24 bits of user data 152 and 4 bits of status and control information which are combined in a status block (status nibble) 154. The status block 154 has two unused bits. Of these two free bits, it is possible for one or two bits to be used for transmitting the signature $S_i$ or the integrity protection information, for example. In FIG. 3, the first bit of the status block 154 is used for transmitting the signature $S_i$, for example. For a cryptographic extension of the SENT protocol, the i-th communication frame 150 is subsequently considered by way of example, the communication frame having a block of user data $B_i$ of the length m=24+3=27 bits and the signature $S_i$ of the length 1 bit. Before the start of the transmission of the transmission packets $B_iS_i$ from the data transmitter 100 to the data receiver 120, it is possible to perform a challenge/response check, for example, in order to increase the protection for the blocks of user data $B_i$ against manipulation.

Figure 4:
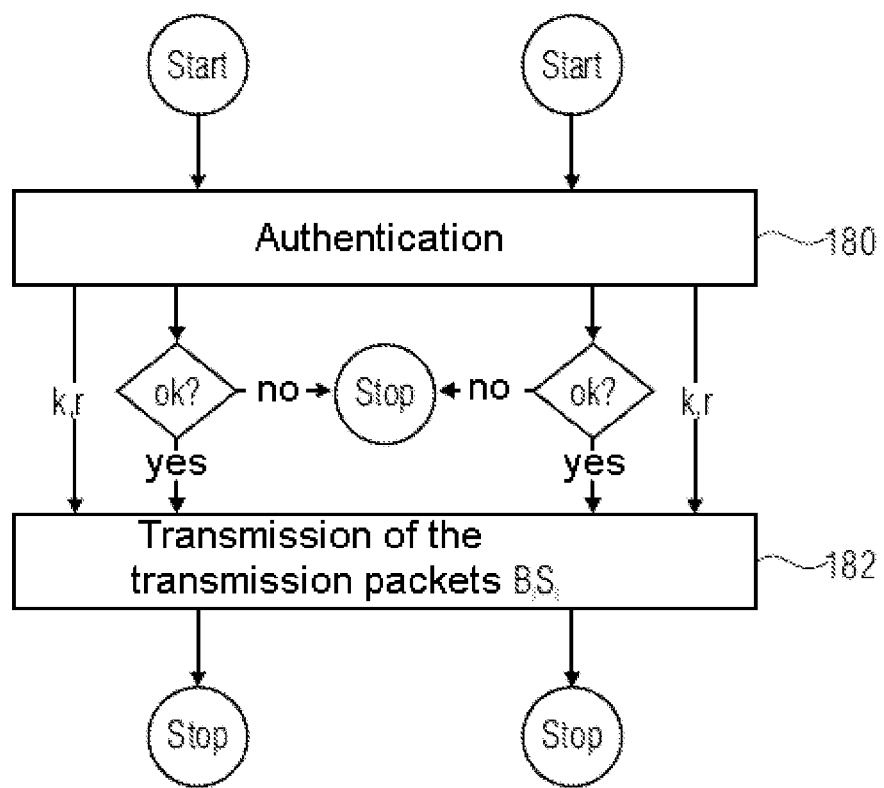
FIG. 4 shows two required steps for setting up a secure connection between data transmitter and data receiver.

FIG. 4 shows two required steps for setting up a secure connection between the data transmitter 100 and the data receiver 120. The first step 180 comprises the authentication of the data transmitter 120 as a prerequisite for setting up a secure communication or connection. Furthermore, if necessary, the data transmitter 100 can be authenticated to the data receiver 120, for example. To this end, the data transmitter 100 and/or the data receiver 120 may have a challenge/response device 112 or 126, for example. In a second step 182, if the authentication is successful, the data transmission or transmission of the transmission packets $B_iS_i$ between a data transmitter 100, e.g. a sensor, and a data receiver 120, e.g. the engine controller, can be started. If the authentication fails, the data transmitter 100 or the data receiver 120 can terminate the connection, for example, since it can be assumed that a hacker is attempting to manipulate or simulate the data transmitter 100 and/or the data receiver 120, for example. By way of example, if the authentication fails, the engine control unit can assume that a hacker has manipulated the sensor, as a result of which trustworthy transmission packets $B_iS_i$ are no longer being received. The data transmitter 100 and the data receiver 120 and also the first step 180 and the second step 182 therefore extend the known SENT protocol to produce a secure message protocol.

In the first step 180, it is also possible to generate a secret key k and an encrypted version r of a random number R which is required for setting up a secure communication channel between the data transmitter 100 and the data receiver 120 and hence for the second step 182 of transmitting the transmission packets $B_iS_i$. The prerequisites for generating the secret key k and the encrypted version r of the random number R are presented below.

A first prerequisite for successful authentication and for the subsequent transmission of the transmission packets $B_iS_i$ is that the data transmitter 100 and the data receiver 120 have a shared secret key $k_{ID}$. This shared secret key $k_{ID}$ may have a length of 128 bits, for example. In addition, it is assumed that the keys can be regarded as independent and uniformly drawn random variables. Furthermore, the key is to be protected against reading in the data transmitter 100 and in the data receiver 120 and also during any logistical handling of the key. This means that the key needs to be protected against reading in any situation, e.g. during production, during the transmission of the key to the data transmitter 100 and to the data receiver 120, or when a data transmitter 100 or a data receiver 120 is replaced and it is necessary to update the key.

A second prerequisite is that every data transmitter 100 and data receiver 120 has a dedicated and individual key. This means that one or more data transmitters 100 and/or data receivers 120 can never have the same key. This is a prerequisite in order to ensure that the entire system is not cracked when a hacker cracks a single key from a data transmitter 100 or from a data receiver 120, for example. A single key cracked by the hacker therefore does not threaten the entire system, e.g. a plurality of sensors and controllers for a data bus in a motor vehicle.

A third prerequisite is that the data transmitter 100 and/or the data receiver 120 has/have a true random number generator (TRNG) or a cryptographically pseudo random number generator (PRNG). By way of example, it is subsequently possible for the generated random numbers to be used by the challenge/response device 112 or 126 of the data transmitter 100 or of the data receiver 120 to perform a challenge/response check. Furthermore, the challenge/response devices 112 and 136 of the data transmitter 100 and of the data receiver 120 may have a random number generator, for example, in order to generate the required random numbers themselves.

A fourth prerequisite is that the encryption device of the data transmitter 100 and of the data receiver 120 are operable to perform the same encryption. To this end, the encryption devices 104 and 126 may be operable, for example, to perform AES block encryption (AES=advanced encryption standard). For AES block encryption, it is possible to use 128-bit keys, for example, for encrypting 128-bit blocks of user data $B_i$. By contrast, a decryption device is not required. The AES block encryption can, depending on performance requirements, be implemented in hardware or software. Encryption with a key k is subsequently indicated by c=AES (key=k, d), where d is the unencrypted data and c is the encrypted data.

Figure 5:
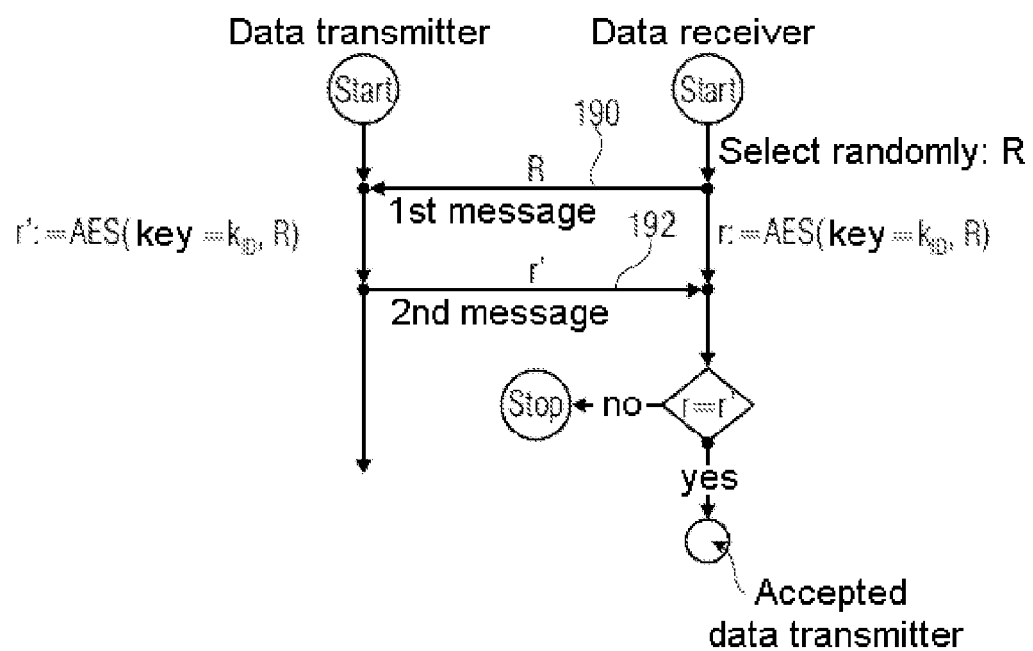
FIG. 5 shows a two-way challenge/response check for authenticating the data transmitter to the data receiver.

FIG. 5 shows a two-way challenge/response check for authenticating the data transmitter 100 to the data receiver 120. This challenge/response check therefore shows one aspect of the first step 180 of the authentication from FIG. 4. R is the random challenge random number, and the challenge random number R has the length t. The length t of the challenge random number R should be no less than t=72 bits, where t can be regarded as a scalable security parameter which can be increased if required. In a first message 190, the data receiver 120 sends the data transmitter 100 the random challenge random number R. Next, both the data transmitter 100 and the data receiver 120 use the shared secret key $k_{ID}$ to ascertain the encrypted version r=AES (key=$k_{ID}$, R) or r'=AES (key=$k_{ID}$, R) of the random number R. The data transmitter 100 is provided with the received encrypted version r' of the random number R and the data receiver 120 is provided with the encrypted version r of the random number R. The data transmitter 100 then uses a second message 192 to send the data receiver 120 the encrypted version r' of the random number R. The data receiver 120, having received the second message, compares the encrypted version r' of the random number R from the data transmitter 100 with its own encrypted version r of the random number R. If the two encrypted versions r' and r of the random number R match (r'=r), the data transmitter 100 has authenticated itself to the data receiver 120 and the data receiver 120 therefore accepts the data transmitter 100. If the two encrypted versions r' and r of the random number R do not match (r'≠r), the authentication has failed and the data receiver 120 does not accept the data transmitter 100.

Alternatively, it is possible to check the validity of the authentication by virtue of the data transmitter 100 changing directly to the data transmission phase instead of transmitting an encrypted version r' of the random number R to the data receiver 120 in a second message 192. In this case, the authentication can take place directly by means of the signature $S_i$, for example.

After the first step 180 or the two-way challenge/response check, the data receiver 120 can be sure that the data transmitter 100 is an original data transmitter 100, provided that the key has not been extracted from the data transmitter 100 and a hacker is not using the extracted key to simulate the data transmitter 100. The random challenge/response check or a random challenge/response protocol prevents repeatable attacks, e.g. attacks which are based on the repetition of previously recorded sessions. Following the authentication, the data transmitter 100 and the data receiver 120 can use the shared information, the key $k_i p$ and the encrypted version of the random number r or r' in the second step 182 of the transmission of the transmission packets $B_i S_i$. In this case, the encrypted version r or r' of the random number R may have a length of 128 bits, for example.

Figure 6:
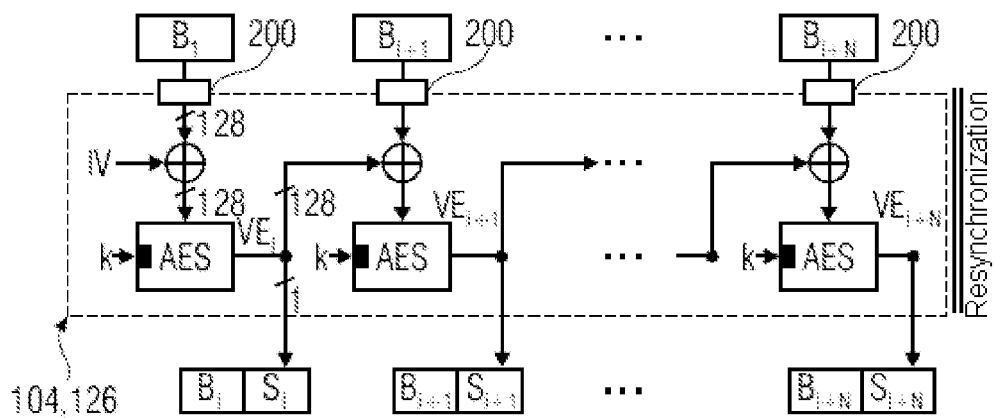
FIG. 6 shows an aspect of an encryption device for obtaining a secure but efficient signature for successive blocks of user data.

FIG. 6 shows an aspect of an encryption device 104 and 126 for obtaining a secure but efficient signature $S_i$ for successive blocks of user data $B_i$. In this case, the signature $S_i$ is obtained by first using a CBC-MAC design (CBC=Cipher Block Chaining), by way of example. The ⊕ symbol represents a combination between two input variables. By way of example, this combination can be effected by an XOR or XNOR addition, e.g. by an XOR or XNOR gate, with two 128-bit vectors being able to be used as input variables, for example. However, the CBC-MAC is not implemented in conventional fashion, i.e. an entire MAC is not transmitted after every transmitted block of user data $B_i$, but rather an incremental signature $S_i$ is generated by virtue of every encryption, e.g. an AES encryption, being followed by the extraction of a portion of the encryption result $VE_i$, which portion is smaller than the encryption result $VE_i$, and the appending of the portion to the unencrypted block of user data $B_i$ in order to obtain a transmission packet $B_i S_i$, wherein the prior encryption result $VE_i$ is used for encrypting the subsequent block of user data $B_{i+1}$. Using the SENT protocol, the extracted portion of the encryption result $VE_i$ may comprise 1 bit, for example, in which case the integrity protection information has a succession of bits $S=S_i, S_{i+1}, S_{i+2}, \ldots, S_{i+N}$.

The blocks of user data $B_i$ are therefore transmitted in unencrypted form and can be observed by everyone, for example. The manipulation of the blocks of user data $B_i$ by a hacker is detected with a very high level of probability, however.

Particularly in the field of automotive sensor systems, it is sufficient for manipulation to be recognized with a delay after a series of transmitted transmission packets $B_i S_i$. However, the recognition must be assured with an extremely high level of certainty after a certain number of transmitted transmission packets $B_i S_i$, e.g. after 50-100 transmitted transmission packets $B_i S_i$. The data transmitter 100 and/or the data receiver 120 do exactly this and furthermore allow implementation in the existing transmission protocols, such as in SENT, SENT/SPC, SEC, PSI5, CAN or FlexRay, which means that costs for the implementation are minimal given a simultaneous high level of gained certainty.

In FIG. 6, the first block of user data $B_1$ can be encrypted using an initial vector IV, for example, which has a length of 128 bits, for example. For the initial vector IV, it is possible to use the encrypted version r of the random number R, for example, that is to say IV=r, for example. This ensures that the succession of calculated signatures $S=S_i, S_{i+1}, S_{i+2}, \ldots, S_{i+N}$ is different after each authentication, even if an identical succession of blocks of user data $B_i$ is to be sent. This means that the sequence S of the signatures $S_i$ is a function of $k_{ID}$ and r, that is to say $S=S(k_{ID}, r)$, for example. For a hacker, the sequence S appears to be a random succession of bits.

Thus, heavy cryptographic primitives are used to iteratively produce and transmit via a data channel a sequence or succession S of signatures $S_i$, or, when the SENT protocol is used, for example, a succession of bits, on the basis of a secret key k, a random number r and a succession of blocks of user data $B_i$. In this case, the calculation function is chosen such that a hacker cannot calculate the next signature $S_{i+1}$ in advance with a feasible level of involvement from knowledge of the random number R, all previous blocks of user data $B_i$ and all previous signatures $S_i$.

The encryption devices 104 and 122 of the data transmitter 100 and of the data receiver 120 may also have a block filler 200 which is operable to fill the block of user data $B_i$ that is to be encrypted prior to the encryption in order to obtain filled blocks of user data. The encryption device 104 or 122, e.g. an AES encryption device, is operable to obtain the encryption result $VE_i$ using the filled blocks of user data, and the extractor is operable to extract a portion of the encryption result $VE_i$, which portion is smaller than the block of user data $B_i$. Using the SENT protocol, the extracted portion comprises 1 bit, for example. This one bit is used in the SENT protocol as a signature $S_i$ or as an integrity protection bit. In this case, it is possible to use AES encryption and the key $k=k_{ID}$, for example, for the encryption.

The message formatter 110 then appends the ascertained signatures $S_i$ to the unencrypted block of user data $B_i$ in order to obtain a transmission packet $B_iS_i$. This transmission packet $B_iS_i$ can be transmitted to the data receiver 120, for example. In this case, the data receiver 120 performs exactly the same steps as the data transmitter 100 using the same initial values, e.g. using the secret key $k_{ID}$ and the encrypted version r of the random number R. The encryption device 126 of the data receiver 120 is thus operable to encrypt the received block of user data $B_i'$ in order to obtain an encryption result $VE_i^*$. Next, the same portion is extracted from this encryption result $VE_i^*$ as in the case of the data transmitter 100 in order to obtain a reference signature $S_i^*$ in order to compare the reference signature $S_i^*$ with the received signature $S_i'$.

Figure 7A:
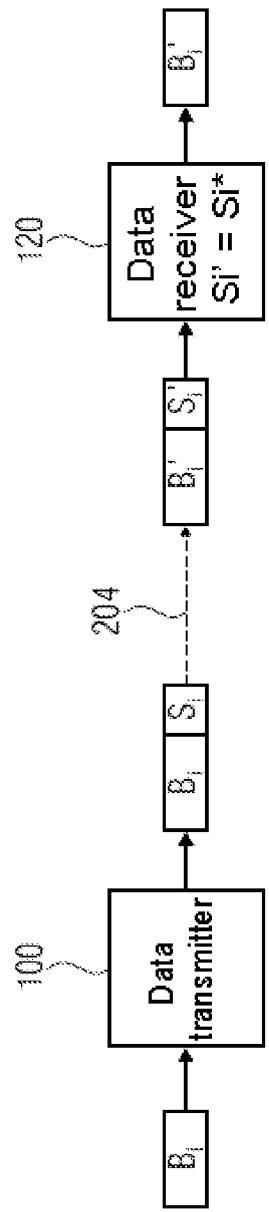
FIG. 7a shows transmission of a transmission packet from a data transmitter via a communication channel to a data receiver.

FIG. 7a shows transmission of a transmission packet $B_iS_i$ from a data transmitter 100 via a communication channel 204 to a data receiver 120, wherein the data receiver 120 receives the transmission packet $B_i'S_i'$. In the event of undisturbed or correct transmission of the transmission packet $B_iS_i$, the data receiver 120 receives a transmission packet $(B_i'S_i')=(B_iS_i)$, and the received signature $S_i'$ is the same as the reference signature $S_i^*$ and therefore also the same as the transmitted signature $S_i$.

Figure 7B:
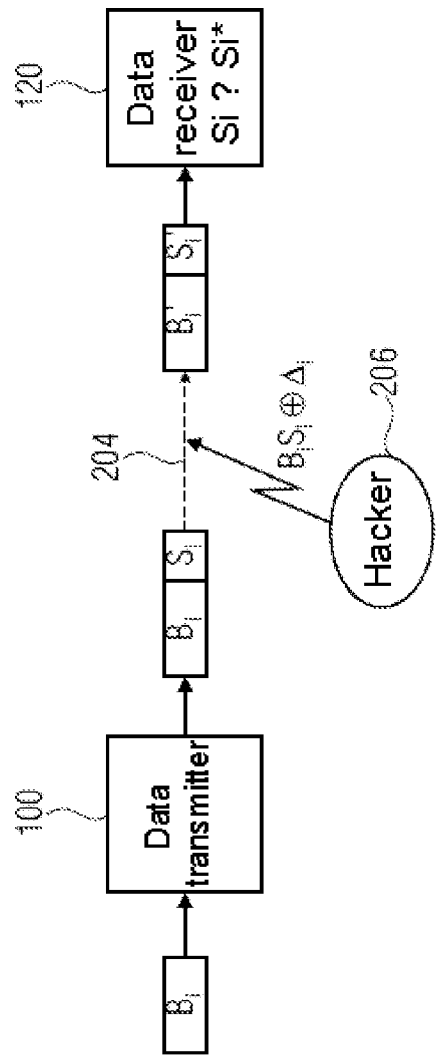
FIG. 7b shows transmission of a transmission packet from a data transmitter via a communication channel to a data receiver, wherein a hacker manipulates the transmission packet during the transmission.

FIG. 7b shows transmission of a transmission packet $B_iS_i$ from a data transmitter 100 via a communication channel 204 to a data receiver 120, wherein a hacker 206 manipulates the transmission packet $B_iS_i$ during the transmission. When a hacker 206 has modified the transmitted blocks of user data $B_i'$, the data receiver 120 receives a transmission packet $(B_i'S_i')=(B_iS_i) \oplus \Delta_i$ instead of $(B_i'S_i')=(B_iS_i)$, where $\Delta_i$ denotes the modification by the hacker 206. Using the SENT protocol, all subsequent signature pairs $(S_{i+1}', S_{i+1}^*)$, $(S_{i+2}', S_{i+2}^*)$, ..., $(S_{i+N}', S_{i+N}^*)$ will therefore differ with the probability of $p=\frac{1}{2}$ as a result of the avalanche effect (error propagation effect) of the block encryption chain of the encryption device, which may have a CBC-MAC design, for example. This means that following malicious modification and when the data receiver 120 has received 120 N transmission packets $B_i'S_i'$, the probability of this attack remaining unnoticed is $P=2^{-N}$. After the transmission of N=20 transmission packets $B_i'S_i'$, for example, the probability of the attack remaining unnoticed is therefore 1:1,000,000.

The effect achieved by the data transmitter 100 and the data receiver 120 is therefore that the transmitted volume of information which is required for protecting the data is minimal and constant. This firstly ensures the realtime capability of the protocol used. Secondly, as the number N of transmitted signatures $S_i$ increases, the certainty of recognition of an attack increases exponentially. Secure error recognition is thus possible; it merely occurs after a delay. Many existing protocol standards, e.g. SENT, SENT/SPC, SEC, PSI5, CAN and FlexRay, can therefore be extended by data integrity protection without losing backward compatibility.

When the transmission packets $B_iS_i$ are being transmitted from the data transmitter 100 to the data receiver 120, a transmission error may occur which, for example for technical reasons, could be caused by severe electromagnetic noise. When a transmission error occurs in a transmitted block of user data $B_i'$, the error propagation property of the encryption device, which has a CBC-MAC design, for example, would result in all subsequent transmitted blocks of user data $B_i'$ not matching with a given probability. When the SENT protocol is used, for example, with a signature $S_i$ which has a length of 1 bit, for example, this probability is $p=\frac{1}{2}$, just as in the case of modification by a hacker 206. For this reason, the data transmitter 100 and the data receiver 120 may have a resynchronization device which is operable to take at least one resynchronization event as a basis for actuating the encryption device 104 or 126 such that the first encryption result $VE_1$ is not dependent on a chronologically prior encryption result $VE_{1-i}$ and that an input for encrypting the first block of user data $B_1$ is dependent only on predetermined data and that the at least second encryption result $VE_2$ is dependent on the first encryption result $VE_1$, wherein the predetermined data comprise the initial vector IV stored in a memory, a random number freshly obtained from the challenge/response device 112 or 136 or an encrypted version of the random number or a block of user data $B_i$. Furthermore, the resynchronization device 138 of the data receivers 120 may be operable, by way of example, to trigger a resynchronization event such that the event can be detected by a data transmitter 100.

An attack and a technical transmission error can be distinguished as follows. When a transmission packet $B_i'S_i'$ is received which has an invalid signature $S_i'$, the received transmission packet $B_i'S_i'$ is rejected and used for no further calculations. In addition, data receiver 120 may have an error counter 140 which is operable to count each transmission error or each rejected transmission packet $B_i'S_i'$ in order to obtain an error rate. The error counter 140 is operable to ascertain the error rate using only a prescribed number of recently received and successive transmission packets $(B_i'S_i')$. Next, the data receiver 120 triggers a resynchronization event which resets its own encryption device 126 and the encryption device 104 of the data transmitter 100, with the internal variables of the encryption chain (e.g. the output of the AES encryption and, by way of example, the input of the XOR addition) being reset to the initial vector IV, for example. Next, the transmission of the transmission packets $B_iS_i$ is continued for the signature $S_i$ of the resynchronized encryption device 104.

The data receiver 120 then uses the error counter 140 to check that the error rate, e.g. the number of errors which have occurred, exceeds a prescribed value in relation to the number of transmitted transmission packets $B_i'S_i'$. If the error rate is the same as or below the prescribed value, it is assumed that there is a random technical transmission error. If this prescribed value is exceeded, however, an attack is assumed. In this case, all subsequent received transmission packets $B_i'S_i'$ can be rejected, for example, and it is also possible for further measurements to be carried out, for example.

In order to protect the transmission of the transmission packet $B_iS_i$ between the data transmitter 100 and the data receiver 120 against side channel attacks, such as against DPA (DPA=differential power analysis) and DFA (DFA=differential fault analysis), the first step 180 can be extended for setting up the connection, that is to say the authentication.

Figure 8:
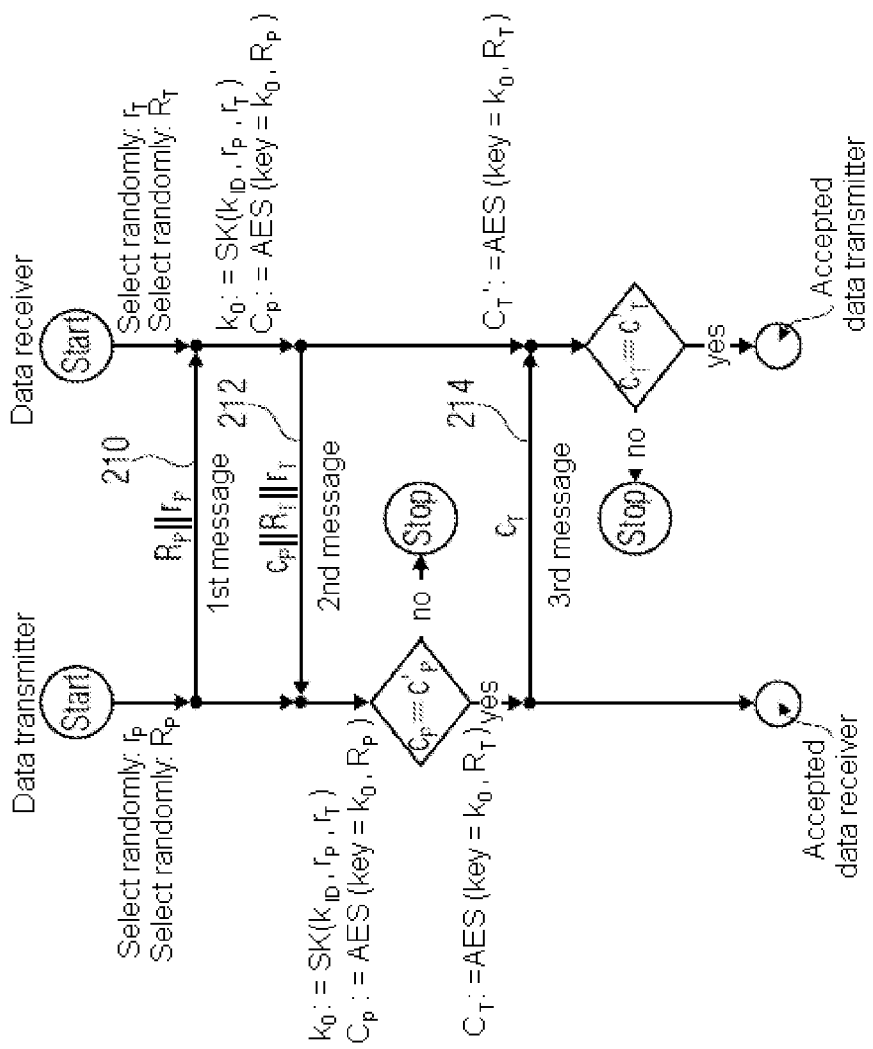
FIG. 8 shows a three-way challenge/response check for the reciprocal authentication between data transmitter and data receiver.

FIG. 8 shows a three-way challenge/response check for the reciprocal authentication between the data transmitter 100 and the data receiver 120. The three-way challenge/response check involves another piece of information being transmitted, with the challenge/response device 112 and 136 of the data transmitter 100 and of the data receiver 120 each having a random number generator or a cryptographic or pseudo random number generator which are operable to generate a true or pseudo random random number.

First, the data transmitter 100 generates two random numbers, a challenge random number $R_P$ and an additional random number $r_P$, which has a length of 48 bits, for example. In the same way, the data receiver 120 generates two random numbers, a challenge random number $R_T$ and a random number $r_T$, which, by way of example, has the same length as the random number $r_P$, for example 48 bits in this case. The challenge random numbers $R_P$ and $R_T$ may each have a prescribed length of 72 bits, for example. The shared secret key $k_{ID}$ and the two public random numbers $r_P$ and $r_T$ can then be used to calculate a session key $k_0$ using a session key derivation function SK:

$$k_0 = SK(k_{ID}, r_P, r_T).$$

In this regard, FIG. 8 shows a first message 210 being transmitted from the data transmitter 100 to the data receiver 120 by way of example. The first message 210 has the challenge random number $R_P$ and the public random number $r_P$. Next, the data receiver 120 ascertains the session key $k_0$ and an encrypted version $c_P$=AES (key=$k_0$, $R_P$) of the challenge random number $R_P$ from the data transmitter 100 using the session key $k_0$.

In a second message 212, the data receiver 120 transmits to the data transmitter 100 the encrypted version $c_P$ of the random number $R_P$ from the data transmitter 100, the challenge random number $R_T$ and the public random number $r_T$. Next, the data transmitter 100 first of all ascertains the session key $k_0$ and, using the session key $k_0$, ascertains its own encrypted version $c_P'$=AES (key=$k_0$, $R_P$) of its own challenge random number $R_P$. If its own encrypted version $c_P'$ of its own challenge random number $R_P$ matches the encrypted version $c_P$—obtained from the data receiver 120—of its own challenge random number $R_P$ ($c_P'$=$c_P$), the data receiver 120 has authenticated itself to the data transmitter 100, whereupon the data transmitter 100 accepts the data receiver 120. If the authentication is successful, the data transmitter 100 also ascertains the encrypted version $c_T$=AES (key=$k_0$, $R_T$) of the challenge random number $R_T$ from the data receiver 120 with the session key $k_0$.

In a third message 214, the encrypted version $c_T$ of the challenge random number $R_T$ from the data receiver 120 is transmitted. The data receiver 120 ascertains its own encrypted version $c_T'$=AES (key=$k_0$, $R_T$) of its own challenge random number $R_T$ and then checks whether the encrypted Version $c_T$—obtained with the third message 214—of its own random number $R_T$ matches its own encrypted version $c_T'$ of the random number $R_T$. If its own encrypted version $c_T'$ of its own challenge random number $R_T$ matches the obtained encrypted version $c_T$ of the random number $R_T$($c_T$=$c_T'$), the data transmitter 100 has authenticated itself to the data receiver, whereupon the data receiver 120 accepts the data transmitter 100. Otherwise ($c_T \neq c_T'$), and the connection setup is terminated.

Alternatively, the validity of the authentication can be checked by virtue of the data transmitter 100 changing directly to the data transmission phase instead of transmitting an encrypted version $c_T$ of its own random number $R_T$ to the data receiver 120 in a third message 214. In this case, the authentication can take place directly by means of the signature $S_i$, for example.

In the embodiment shown in FIG. 5, the session key derivation function SK has an AES encryption and a finite field operation called nonleaking map (NLM). The session key obtained in this manner is then used for the second step 182 from FIG. 4, that is to say for the transmission of the transmission packets $B_iS_i$.

Figure 9:
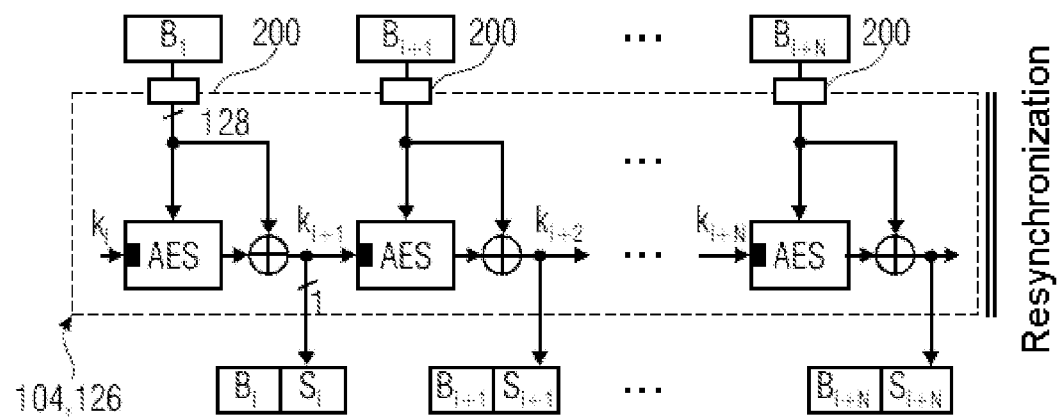
FIG. 9 shows a further aspect of an encryption device for obtaining a secure but efficient signature which is also protected against side channel attacks.

FIG. 9 shows a further aspect of an encryption device 104 and 126 for obtaining a secure but efficient signature which is also protected against side channel attacks. In this case, the design of the MAC chain is based on an HMAC (HMAC=Keyed-Hash Message Authentication Code), a type of MAC which is calculated on the basis of a cryptographic hash function, with a Matyas-Meyer-Oseas design being used as an elementary building block. Prior to the encryption, the blocks of user data $B_i$ are filled by a block filler 200 in order to obtain filled blocks of user data. These filled blocks of user data are then encrypted, with AES encryption being able to be used, for example. FIG. 9 reveals that new keys $k_1$, $k_2$, $k_3$, . . . , $k_N$ are used for every encryption of the MAC calculation chain. These keys are generated iteratively from the previous ones. By way of example, a block of user data $B_i$ is encrypted with the key $k_i$ in order to obtain an encryption result $VE_i$. The subsequent key which is used for encrypting the subsequent block of user data can be obtained from a combination of the encryption result $VE_i$ and the block of user data Bt, for example. This combination can be made using XOR addition or XNOR addition, for example. The first key $k_1$ of the calculation chain is derived from the session key $k_0$ and the challenge random numbers $R_P$ and $R_T$. The use of the variable key $k_i$ instead of the shared secret key $k_{ID}$ for the encryption is a prerequisite so that the transmission of the transmission packets $B_iS_i$ between data transmitter 100 and data receiver 120 is protected against side channel attacks. In the embodiment shown in FIG. 9, the extracted portion of the encryption result $VE_i$, which portion is used as a signature $S_i$, is smaller than the corresponding block of user data $B_i$. The data transmitter 100 and the data receiver 120 therefore introduce a previously unknown level of security against attacks, for example against protocol attacks and against physical attacks and also particularly against differential side channel attacks, in the field of automotive sensor systems, for example.

In addition, when realtime requirements are high or extreme, it may be necessary for a data receiver 120 already to require data from a data transmitter 100, for example, before authentication between the data transmitter 100 and the data receiver 120 can be performed successfully. In this case, the data transmitter 100 and the data receiver 120 may be operable, by way of example, to transmit transmission packets $B_iS_i$ at the beginning of the data transmission which are (initially) not authenticated or unable to be authenticated. The authentication can then be added after a delay, for example.

The signatures $S_i$ transmitted with the transmission packets $B_iS_i$ may initially be dummy signatures, for example, which cannot be evaluated or used for authentication. There may therefore be two states, a first state in which unauthenticated transmission packets $B_iS_i$ are transmitted and a second state in which authenticated transmission packets $B_iS_i$ are transmitted. A change from the first state to the second state can be ensured, by way of example, by virtue of the data receiver 120 being operable to receive only a limited number of transmission packets $B_iS_i$. This number can be stipulated or prescribed in advance, for example, during the first state. The data receiver 120 may also be operable to transmit the random number R, as shown in FIG. 5, to the data transmitter 100 during the first state. The data transmitter 100 may also be operable to transmit transmission packets $B_iS_i$ during the first state which have a data pattern which is known, for example, as signature $S_i$. In this case, the data receiver 120 is able, by way of example, to interpret a change in the known data pattern by the data transmitter 100 as a change from the first state to the second state, with the transmission packets $B_iS_i$ subsequently being able to be transmitted in authenticated fashion in the second state.

If a change from the first state to the second state does not take place within a prescribed time window or time interval or after a prescribed number of transmitted transmission packets $B_iS_i$, for example, the data receiver 120 may be operable, by way of example, to interpret this as an attack and to terminate the transmission, for example. Alternatively, the data transmitter 100 and the data receiver 120 may be operable, by way of example, to count the number of transmission packets $B_iS_i$, with a change from the first state to the second state being able to take place after a (firmly) prescribed number of transmission packets $B_iS_i$. Optionally, the change from the first state to the second state can take place after a prescribed time, e.g. a waiting time.

In addition, it is possible to check the validity of the authentication by changing directly to the data transmission phase instead of checking the validity of the authentication by sending back r' (encrypted version of the random number R), $c_P$ (encrypted version of the random number $R_P$) or $c_T$ (encrypted version $c_P$ of the random number $R_T$). The authentication is then provided directly by the signature $S_i$, for example.

The embodiments of protecting the integrity of the data transmitter 100 and the data receiver 120 can be implemented in further protocols, e.g. in further inexpensive bidirectional protocols, such as in the PSI5 protocol. The embodiments described herein are always advantageous when it is not necessary to recognize errors immediately after every transmission of a transmission packet $B_iS_i$, that is to say when recognition in realtime is not necessary. Furthermore, the listed embodiments are always advantageous when it is not possible—as a result of the available bandwidth and/or the maximum delay time to be observed—to insert an entire MAC after each block of user data $B_i$ or after a plurality of blocks of user data. The embodiments shown can therefore be used for extending existing protocols, since the transmission requires only very few bits and even, depending on the embodiment, only a single bit, with the security increasing with every transmitted block of user data $B_i$, since from the second block of user data $B_2$ onward, the respective previous encryption result $VE_i$ is used for calculating the signature $S_i$.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A data transmitter for transmitting successive blocks of user data, comprising:

an encryption device operable to encrypt a first block of user data in order to obtain a first encryption result and encrypt a second block of user data, which follows the first block of user data, to obtain a second encryption result, the encryption device being further operable to use the first encryption result for encrypting the second block of user data;

an extractor operable to extract a first portion of the first encryption result which is smaller than the first encryption result, and a second portion of the second encryption result which is smaller than the second encryption result; and a message formatter operable to combine the first block of user data and the first portion as a signature for the first block of user data to produce a first transmission packet, and combine the second block of user data and the second portion as a signature for the second block of user data to produce a second transmission packet.

2. The data transmitter as claimed in claim 1, wherein the encryption device is operable to encrypt the first block of user data and the second block of user data with a secret key to obtain the first encryption result and the second encryption result.

3. The data transmitter as claimed in claim 1, wherein the encryption device is operable to encrypt the first block of user data with a first secret key and encrypt the second block of user data with a second secret key, and wherein the encryption device is operable to obtain the second secret key from at least one of the first encryption result, the first block of user data and the first key.

4. The data transmitter as claimed in claim 3, wherein the encryption device comprises an XOR or XNOR gate to which the first encryption result, the first block of user data or the first key is applied.

5. The data transmitter as claimed in claim 1, wherein the encryption device is operable to combine the second block of user data with the first encryption result prior to the encryption.

6. The data transmitter as claimed in claim 1, wherein the encryption device is operable to combine the first block of user data with an initial vector prior to the encryption.

7. The data transmitter as claimed in claim 6, further comprising a challenge/response device operable to obtain a random number which is true or pseudo random, and wherein the encryption device is operable to use the random number or an encrypted version of the random number as the initial vector.

8. The data transmitter as claimed in claim 7, wherein the encryption device is operable to use the random number or the encrypted version of the random number to perform a challenge/response check, and wherein the encryption device is operable to use the random number or the encrypted version of the random number as the initial vector if the challenge/response check is successful.

9. The data transmitter as claimed in claim 8, wherein the challenge/response device is operable to provide a dummy signature prior to performing the challenge/response check, and wherein the message formatter is operable to combine at least the first block of user data with the dummy signature in order to produce the at least first transmission packet.

10. The data transmitter as claimed in claim 1, wherein the encryption device comprises a block filler operable to fill the first block of user data and the second block of user data to obtain filled blocks of user data, wherein the encryption device is operable to obtain the first encryption result and the second encryption result using the filled blocks of user data, and wherein the message formatter is operable to use the first block of user data and the second block of user data to produce the first transmission packet and the second transmission packet prior to the filling of the first and second blocks of user data.

11. The data transmitter as claimed in claim 1, wherein the encryption device is operable to use the first encryption result as a key for the encryption of the second block of user data.

12. The data transmitter as claimed in claim 1, wherein the extractor is operable to extract, as a portion of the first encryption result and as a portion of the second encryption result, a number of bits which is less than ⅛ of the bits of the first encryption result and of the second encryption result.

13. The data transmitter as claimed in claim 12, wherein the extractor is operable to extract, as a portion of the first encryption result and as a portion of the second encryption result, the least significant bit.

14. The data transmitter as claimed in claim 1, wherein the encryption device is operable to encrypt at least ten blocks of user data which follow the second block of user data to obtain further encryption results, wherein each further block of user data is encrypted based on a prior encryption result, wherein the extractor is operable to extract a portion of each further encryption result which in each case is less than ⅛ of the bits of the relevant encryption result, and wherein the message formatter is operable to combine the further blocks of user data with the further portions to produce further transmission packets.

15. The data transmitter as claimed in claim 1, further comprising a resynchronization device operable to take at least one resynchronization result as a basis for actuating the encryption device such that the first encryption result is not dependent on an encryption result from a prior time and that an input for encrypting the first block of user data is dependent only on predetermined data and that the at least second encryption result is dependent on the first encryption result, wherein the predetermined data comprise an initial vector stored in a memory, a random number freshly obtained from a challenge/response device of the data transmitter, or an encrypted version of the random number or a block of user data.

16. A data receiver, comprising:
 a reception device operable to receive transmission packets, each received transmission packet having a received block of user data and a received signature;
 a message extractor operable to extract the received transmission packets in order to obtain the received block of user data and the received signature;
 an encryption device operable to encrypt the received block of user data to obtain an encryption result;
 an extractor operable to extract a portion of the encryption result to obtain a reference signature; and
 a comparison device operable to compare the received signature with the reference signature;
 wherein for a valid transmission packet the received signature is the same as the reference signature.

17. The data receiver as claimed in claim 16, further comprising a challenge/response device operable to obtain a random number which is true or pseudo random, and wherein the encryption device is operable to use the random number or an encrypted version of the random number as an initial vector or as a key.

18. The data receiver as claimed in claim 17, wherein the challenge/response device is operable to perform a challenge/response check, and wherein the encryption device is operable to use the random number or the encrypted version of the random number as the initial vector or the key if the challenge/response check is successful.

19. The data receiver as claimed in claim 16, further comprising an output device operable to output the received block of user data for a valid transmission packet and reject the received block of user data for an invalid transmission packet.

20. The data receiver as claimed in claim 16, further comprising a resynchronization device operable to output a resynchronization result for a valid transmission packet and actuate the encryption device such that the first encryption result is not dependent on an encryption result from a prior time and that an input for encrypting the first block of user data is dependent only on prescribed data and that the at least second encryption result is dependent on the first encryption result, and wherein the prescribed data comprise an initial vector or key stored in a memory, a random number freshly obtained from a challenge/response device of the data receiver, or an encrypted version of the random number or a block of user data.

21. The data receiver as claimed in claim 19, further comprising an error counter operable to count every received transmission packet and every invalid transmission packet to ascertain an error rate, wherein the error counter is operable to ascertain the error rate using only a prescribed number of recently received and successive transmission packets, and wherein the output device is operable to reject the received block of user data and all subsequent blocks of user data if the error rate exceeds a prescribed value.

22. A method for transmitting successive blocks of user data, comprising:
 encrypting a first block of user data to obtain a first encryption result;
 encrypting a second block of user data, which follows the first block of user data, to obtain a second encryption result, the first encryption result being used to encrypt the second block of user data;
 extracting a first portion of the first encryption result, the first portion being smaller than the first encryption result, and a second portion of the second encryption result, the second portion being smaller than the second encryption result;
 combining the first block of user data and the first portion as a signature for the first block of user data to produce a first transmission packet; and
 combining the second block of user data and the second portion as a signature for the second block of user data to produce a second transmission packet.

23. A method for receiving transmission packets which each have a block of user data and a signature, comprising:
 extracting a received transmission packet to obtain a received block of user data and a received signature;
 encrypting the received block of user data to obtain an encryption result;
 extracting a portion of the encryption result to obtain a reference signature; and
 comparing the received signature with the reference signature, wherein for a valid transmission packet the received signature is the same as the reference signature.

* * * * *